United States Patent [19]

Hidding

[11] 4,363,772

[45] Dec. 14, 1982

[54] METHOD AND APPARATUS FOR INJECTION MOLDING UTILIZING EXPANDABLE CAVITY

[76] Inventor: Daniel P. Hidding, Rte. 2, Ridgecroft La., Barrington, Ill. 60010

[21] Appl. No.: 57,808

[22] Filed: Jul. 16, 1979

[51] Int. Cl.³ .............................................. B29F 1/00
[52] U.S. Cl. ................................................. 264/328.7
[58] Field of Search ............ 264/328, DIG. 83, 328.7

[56] References Cited

U.S. PATENT DOCUMENTS

| | | | |
|---|---|---|---|
| 3,016,574 | 1/1962 | Fischer | 264/328.7 X |
| 3,632,729 | 1/1972 | Bielfeldt | 264/DIG. 83 X |
| 4,073,844 | 2/1978 | Wada | 264/DIG. 83 X |
| 4,096,218 | 6/1978 | Yasuike | 264/DIG. 83 X |

FOREIGN PATENT DOCUMENTS

| | | | |
|---|---|---|---|
| 2552846 | 10/1976 | Fed. Rep. of Germany | 264/DIG. 83 |
| 48-20023 | 6/1973 | Japan | 264/328.7 |

Primary Examiner—Thomas P. Pavelko
Attorney, Agent, or Firm—Lee, Smith & Jager

[57] ABSTRACT

A method and apparatus for virtually eliminating the web-like "jetting" lines on finished injection molded products by utilizing an expandable cavity which is initially set at a reduced or minimum size to intercept resin flow and disperse it as it enters the cavity, the resin being maintained under pressure within the partially filled cavity, wherein the cavity expands under pressure of the resin flowing therein until the finished size of the end-product is attained.

1 Claim, 7 Drawing Figures

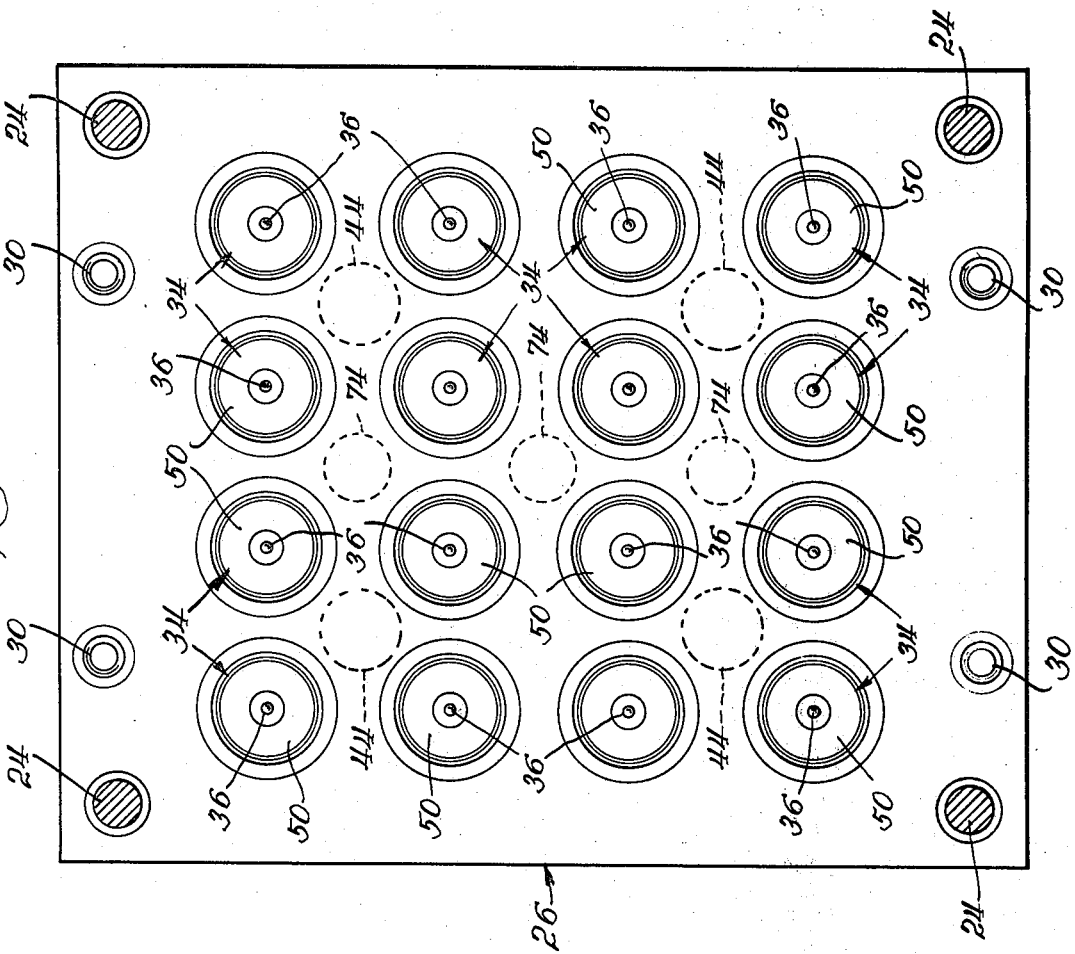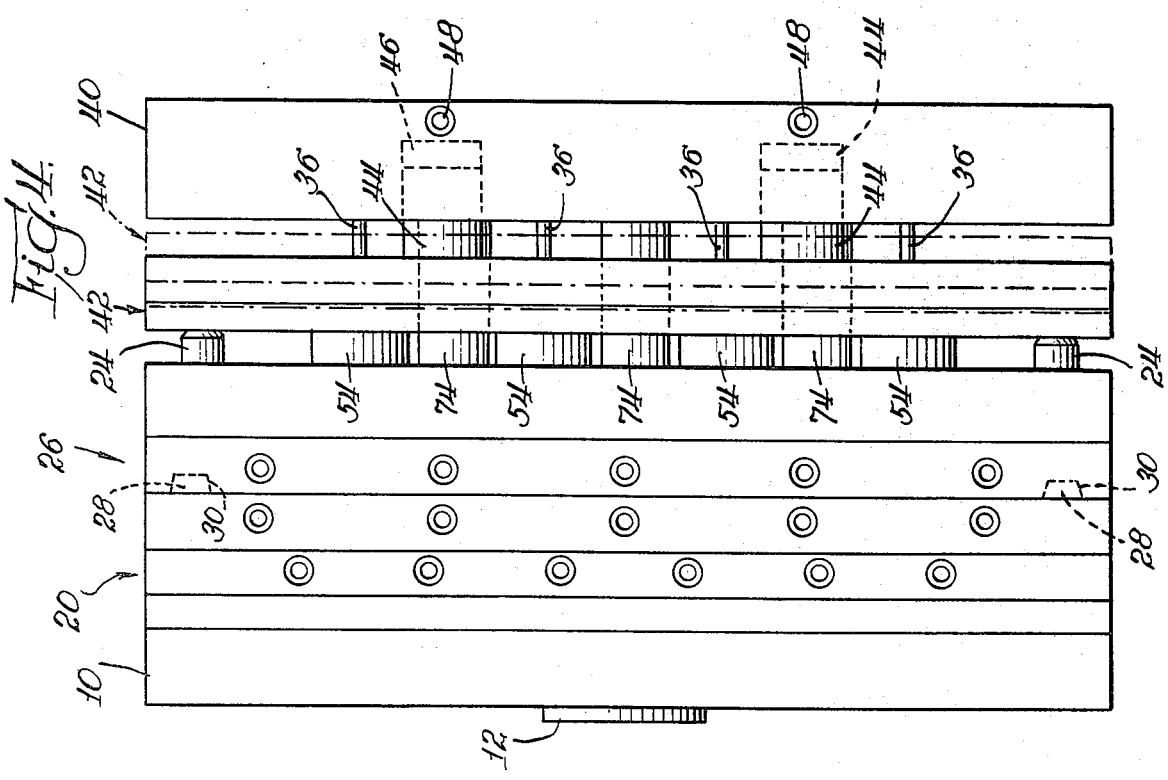

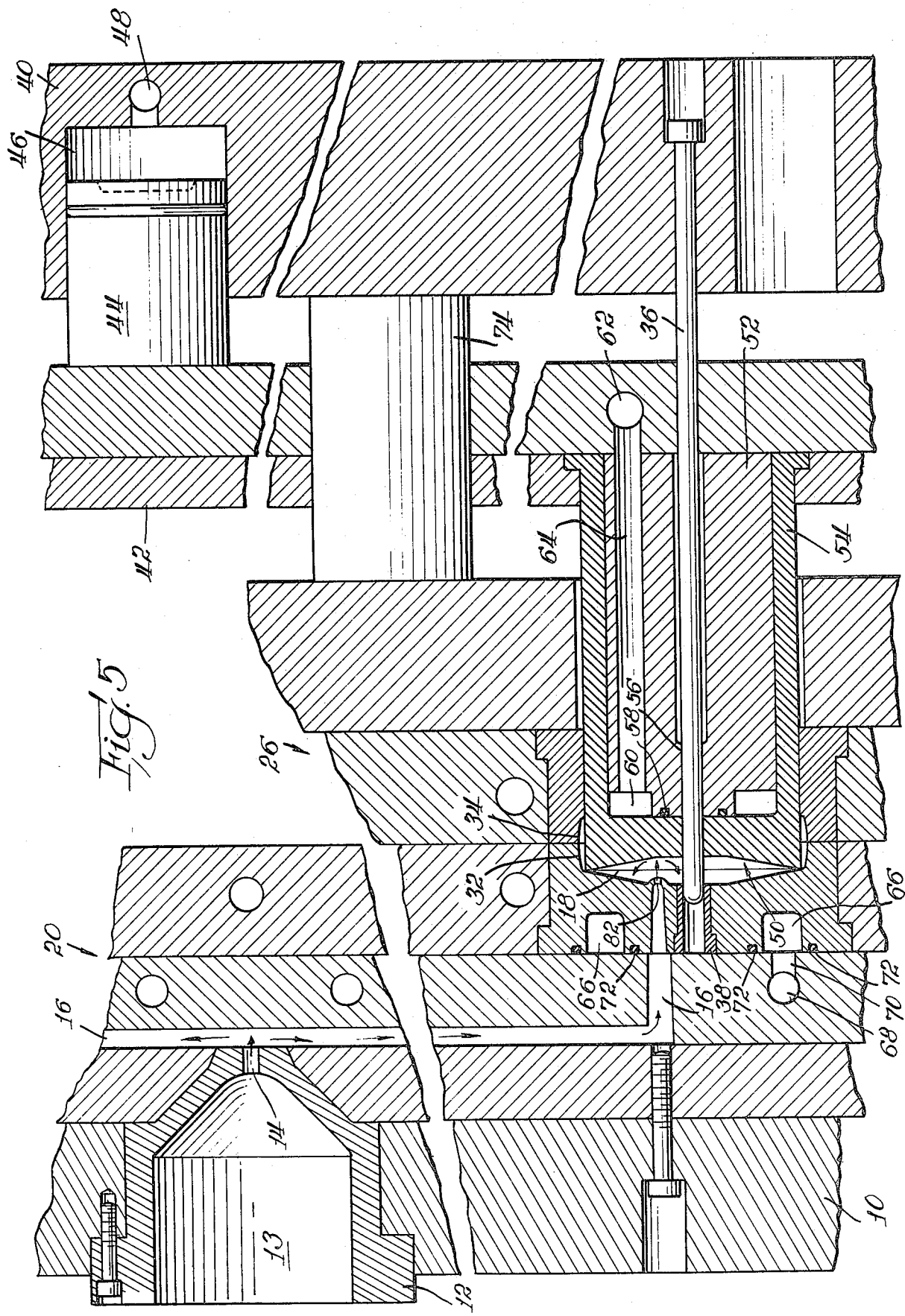

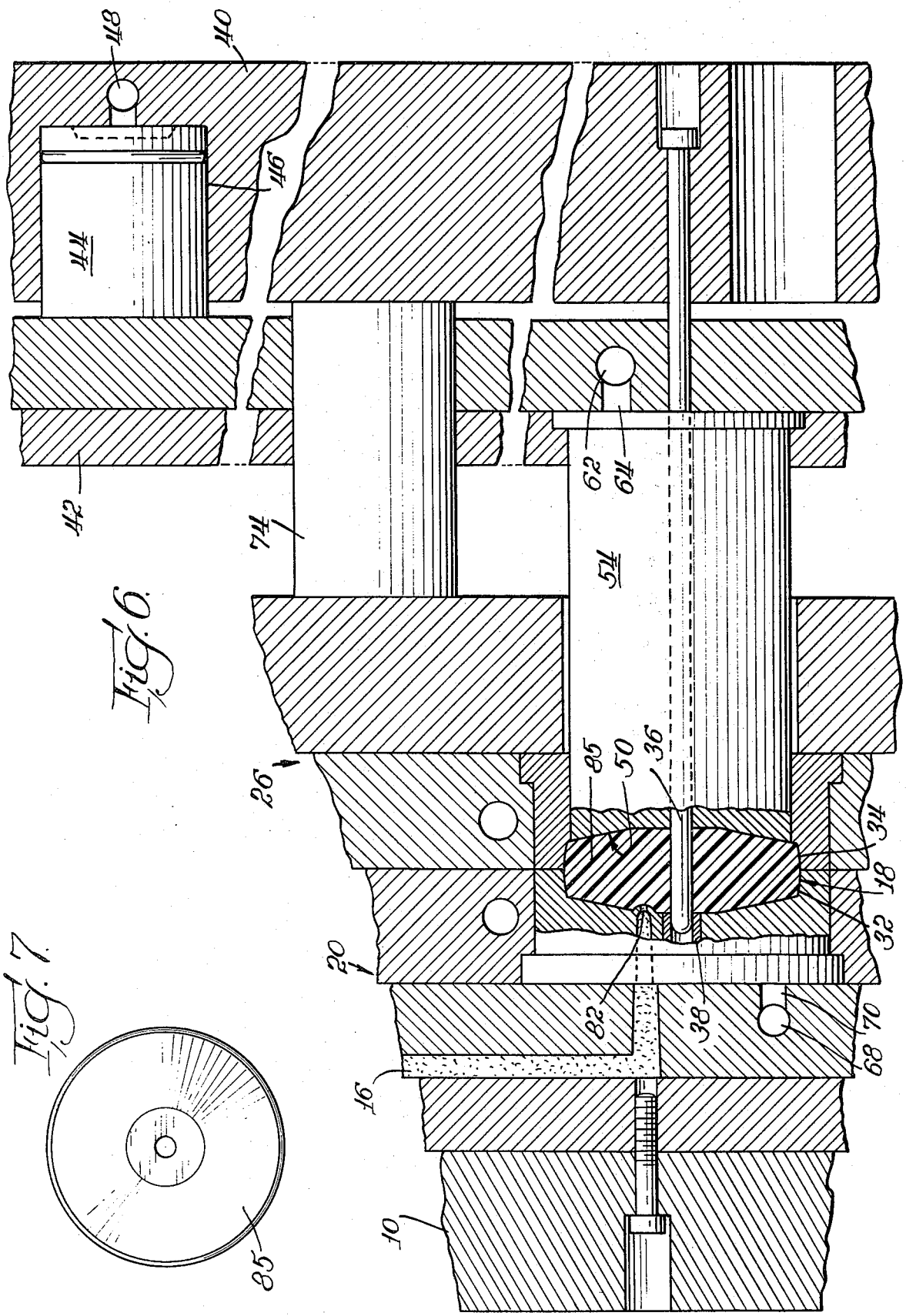

METHOD AND APPARATUS FOR INJECTION MOLDING UTILIZING EXPANDABLE CAVITY

BACKGROUND OF THE INVENTION

1. Field of the Invention

The present invention is related to apparatus and processes for injection molding of finished parts and is particularly directed to the means and method for eliminating jetting from parts where this normally occurs.

2. Description of the Prior Art

During injection molding processes, resin is supplied under pressure to a cavity in a mold which conforms to the desired shape of the finished product. When the finished product reaches a threshold size, depending upon the resin used, the pressure of the mold and other external factors not pertinent to the understanding of the invention, the size of the cavity actually permits the resin to flow unobstructed through the gate in a snake-like fashion called "jetting". Partial curing of the jetted resin causes web-like lines to occur on the exterior surface of the finished product. Heretofore, trial and error has been the most acceptable method for finding the right combination of resin, pressure, temperature and cavity size to minimize "jetting".

It is also known to provide a core-pin or similar stationary member inside the cavity to intercept and break up the spaghetti-like stream of resin as it enters the cavity. This has been effective in reducing, but not eliminating, "jetting" on the finished product.

SUMMARY OF THE INVENTION

I have discovered that "jetting" can be virtually eliminated by using an expandable cavity wherein the pressure of the injected resin is utilized as the force to expand the cavity to its full size as the cavity is filled. This method breaks up the jetting resin stream as it enters the cavity and changes the flow pattern from jetting to one of laminar flow, spreading the resin throughout the largest possible space, while maintaining the resin under controlled pressure throughout the injection process.

The expandable cavity is provided by making one portion of the cavity movable relative to the other, which remains stationary. The movable portion is maintained under a constant back pressure for urging the movable portion forwardly into engagement with or toward the stationary portion, thus reducing the size of the cavity. The resin is then introduced into this reduced size cavity through an aperture (gate) provided in the stationary portion thereof. The movable portion of the cavity intercepts the resin as it enters the cavity and immediately disperses it prior to any partial curing due to a reduction of pressure. As this reduced size cavity is filled, the pressure of the resin within the cavity increases until it overcomes the aforesaid back pressure externally applied against the movable portion of the cavity. At this time, the continued introduction of resin into the cavity under pressure forces the movable portion of the cavity rearwardly away from the stationary portion, causing the cavity to expand until it reaches its maximum size.

By utilizing a cavity which is expanded from an initial small size to full size, the resin stream is broken up almost immediately upon entry into the cavity and the cavity is initially "filled" before any substantial curing occurs at the surface. Thereafter the resin is forced into the cavity under maximum pressure, and the cavity is forceably expanded to its full size. This virtually eliminates "jetting" in the final product.

In order to accomplish this, I have utilized a stationary clamp plate assembly 10 and floating cavity plate assembly 20 which are held in communication with the nozzle of an injection molding machine in the typical manner. The stationary portion of the cavity is formed by the floating cavity plate assembly and a modified knock-out side cavity plate assembly. The movable portion of the cavity is formed by a portion of a pressure plate assembly which is movable toward and away from the floating cavity plate assembly within the portion of the cavity formed by the knock-out side cavity plate assembly. The knock-out side cavity plate assembly is positioned adjacent the floating cavity plate assembly for combining the two halves of the mold, and external pressure is exerted by a back plate assembly against the pressure plate assembly to move the cavity defining portion thereof toward the floating plate assembly thereby reducing the cavity size. As the resin flows into the cavity, the pressure of the resin within the cavity overcomes the externally applied pressure on the pressure plate assembly. This causes the pressure plate assembly to move away from the floating cavity plate assembly to expand the cavity. The optimum amount of external back pressure to be applied by the back plate assembly against the pressure plate assembly will depend in part upon the resin being used, the cavity size, the temperature of operation and other operating conditions, but may be readily determined by trial and error. It is always less than the injection molding pressure.

BRIEF DESCRIPTION OF THE DRAWINGS

FIG. 3 is a section view taken at line 3—3 of FIG. 1.

FIG. 4 is a view similar to FIG. 1, illustrating the mold in the closed, assembled condition.

FIG. 5 is a partial section view, enlarged for clarity of detail and understanding, illustrating a single cavity in the mold assembly of FIG. 1.

FIG. 6 is a view similar to FIG. 5, illustrating the mold assembly in the closed, filled condition.

FIG. 7 is an elevation view of an end-product made in accordance with the teachings of the present invention.

DESCRIPTION OF THE PREFERRED EMBODIMENT

Figure 1:
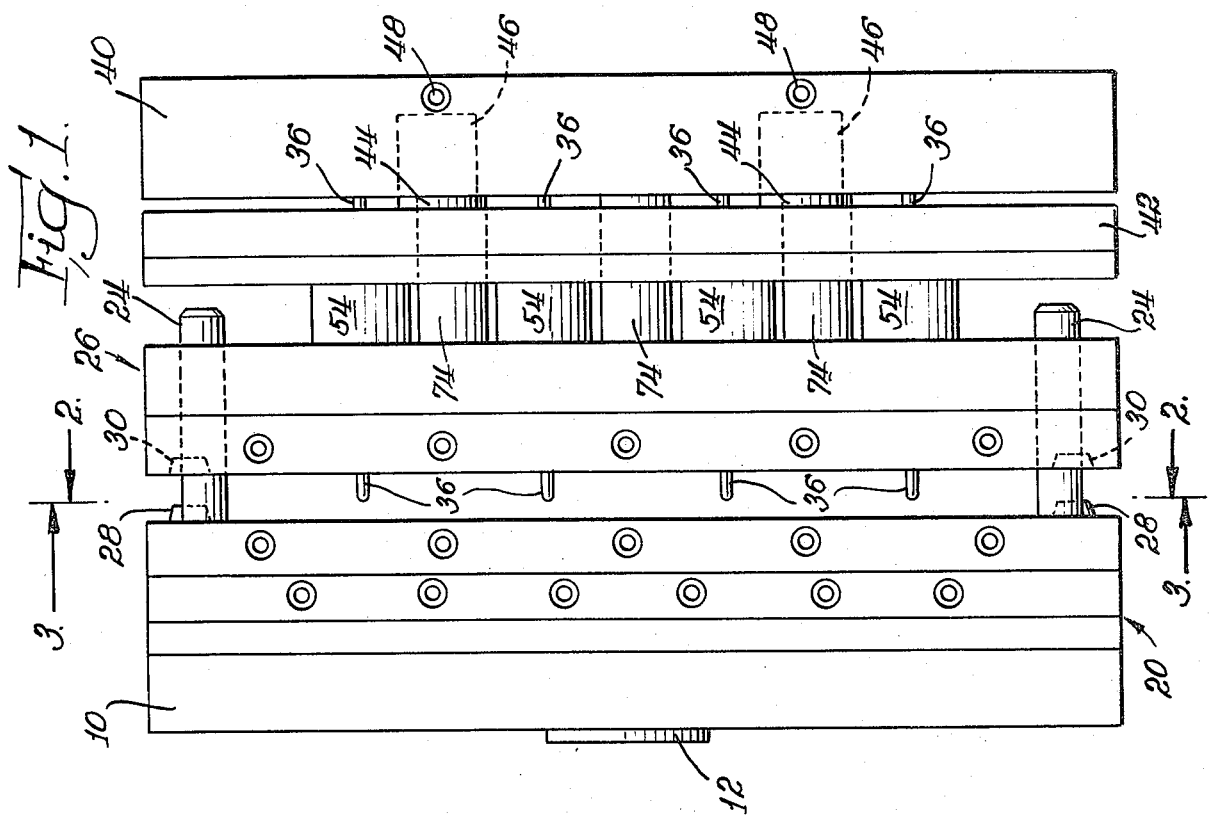
FIG. 1 is an elevation view of a mold assembly according to the present invention.
Figure 2:
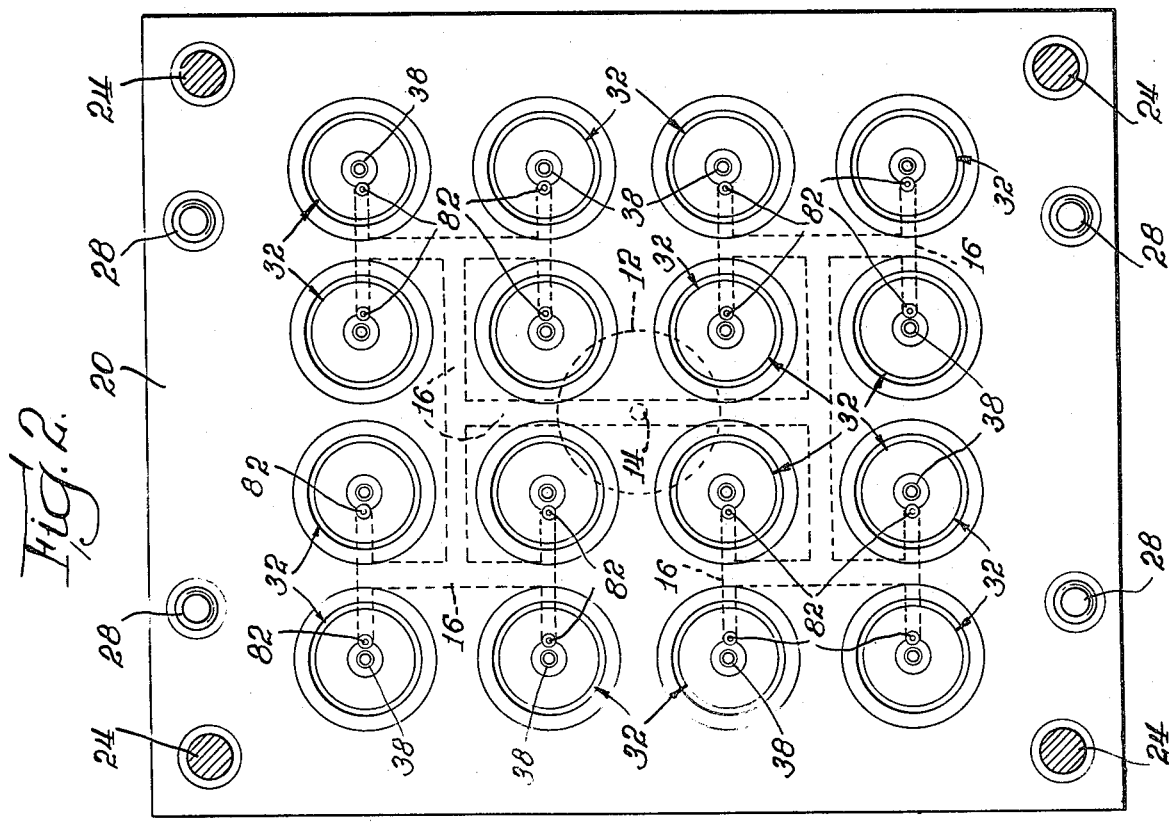
FIG. 2 is a section view taken at line 2—2 of FIG. 1.

Referring to FIGS. 1 and 2, the mold assembly of the preferred embodiment includes a stationary clamp plate assembly 10 having raised surface or boss 12 including a through bore 13 (see FIG. 5) which is adapted to be placed in sealing engagement with the nozzle of an injection molding machine (not shown). In operation, resin flowing through bore 13 is introduced through aperture 14 and into flow passages or runners 16 of floating cavity plate assembly 20 for filling the mold cavities 18 therein. The mold cavities 18 and flow passageways 16 are an integral part of the floating cavity plate assembly 20, which is releasably secured to plate 10 in well known manner such that the flow passageways 16 are in communication with the aperture 14. Mounting posts 24 project outwardly from plate assembly 10 and slidably receive the floating cavity plate assembly 20 for ensuring accurate alignment between the plate assemblies 10 and 20.

Upon completion of a molding operation, plate assembly 20 is separated from plate assembly 10 so that flow passageways 16 may be cleared of "runners" of hardened resin prior to the next operation.

A knock-out side cavity plate assembly 26 (see FIG. 3) is also slidably received by guide pins 24 and is movable into precise, aligned engagement with the floating cavity plate assembly 20. Precision mating is ensured by the complementary, mated male tabs 28 in plate assembly 20 and female, tab-receptive sockets 30 in plate assembly 26 (see FIG. 4). As shown in FIGS. 2 and 3, the plate assemblies 20 and 26 include complementary cavity halves 32, 34 respectively, of the part-defining cavities 18 of the mold. As shown in FIGS. 1 and 3, an elongated pin or core 36 is positioned in the center of each cavity 18 and extends axially therethrough when the cavity halves 32 and 34 are engaged to define the cavity 18. A core-receptive bushing 38 is provided in each cavity half 32 of floating plate assembly 20.

Back plate assembly 40 is disposed rearwardly of the knock-out side cavity plate assembly 26 with a pressure plate assembly 42 being disposed therebetween. A plurality of pistons 44 project rearwardly from pressure plate assembly 42 and are received by cylinders 46 provided in back plate assembly 40. Inlets 48 in back plate assembly 40 are in communication with cylinders 46 and, in the preferred embodiment, are coupled to a pressurized fluid supply line (not shown) whereby a pressure is exerted against pistons 44 for urging the pressure plate assembly 42 into engagement with the knock-out side cavity plate 26. Each cavity half 34 in the knock-out side cavity plate includes a face 50 which, as best seen in FIGS. 5 and 6, comprises the outside of the end wall of an enlongated cylinder 54 which is rigidly mounted on pressure plate assembly 42 in suitable manner. An internal plug 52 is disposed in each cylinder 54 and includes an axial bore 56 for receiving the core pin 36.

A seal 58 is disposed between the plug 52 and the inside of the end wall of cylinder 54 to define a sealed chamber 60. Chamber 60 is in communication with port 62 in the pressure plate assembly 42 via passageway 64 provided in the plug 52.

A second sealed chamber 66 is provided in plate assembly 20 and is in communication with port 68 therein via passageway 70. Sealing is provided by O-rings 72. During operation, temperature control fluids are introduced into ports 62 and 68 and thus into chamber 60 and 66 in order to maintain the temperature of the cavity walls at a desired level during the flow of resin into cavity 18.

A support pillar 74 is disposed between the knock-out side cavity plate assembly 26 and back plate assembly 40 for maintaining a fixed spaced relationship therebetween. The pressure plate assembly 42 is slidably received by support pillar 74 and is movable in the space between plate assemblies 26 and 40 from the fully closed molding position illustrated in FIG. 5 to the fully open position illustrated in FIG. 6 (see also FIG. 4). The cylinders 46, which are adapted to receive the pistons 44, are in communication with ports 48, and the cylinders are placed under pressure by supplying a pressurized fluid thereto prior to the injection process for urging the pistons 44 forward and advancing pressure plate assembly 42 into the fully closed position illustrated in FIG. 5. This advances the cylinder 54 and end face 50 into engagement with the walls of the complementary cavity half 32, whereby cavity 18 is decreased to minimum size. The pressure force (p.s.i.) acting against each piston 44 is maintained at a sufficient level to hold cylinder 54 against the pressure of the incoming resin until the reduced cavities fill and the pressure of the resin within the cavities approaches the full injection molding pressure. At this point the pressure of the resin within the cavities overcomes the force holding the cylinder 54 forward and this cylinder and the pressure plate assembly 42 are forced rearwardly to the open position, as shown in FIG. 6. The cylinders 46 define positive stops for limiting the movement of end walls 50.

Thus, resin will flow from the nozzle of the injection molding machine into the aperture 14, and through the passageways 16 into the various cavities 18 through inlets 82, and as this happens the reduced cavity, provided when the pressure plate assembly 42 is in the closed molding position, beings to fill. As this reduced cavity fills, the force of the injected resin forces the pressure plate assembly 42 rearwardly into the open position until the cavity is completely filled as shown in FIG. 6.

By initially positioning the cavity-defining end wall 50 of cylinder 54 adjacent the inlet 82, the resin as it enters the cavity will be constantly intercepted by and will impinge upon a rigid object (the end wall 50 of cylinder 54), thus breaking up the stream of resin as it enters into the cavity through the aperture or gate 82. This breaks up the "jetting" effect which heretofore caused undesirable web-like configurations in the finished product due to partial curing of the resin before the cavities were filled.

Thus, the movable cavity wall provided by the end wall 50 of the movable cylinder 54 permits the production of a smooth-surfaced final product such as wheel 85, illustrated in FIG. 7. No "jetting" lines occur in a product made in accordance with the teachings of the present invention. Of course, the apparatus and process of the present invention may be utilized to provide smooth-surfaced products for a wide variety of parts where due to the size or shape of the mold cavity "jetting" would otherwise occur as a result of partial curing of the resin before the cavity was filled.

Upon completion of the injection process, the back plate assembly 40, pressure plate assembly 42 and the knock-out side cavity plate assembly 26 are removed from the floating cavity plate assembly 20 and the finished products 85 are removed from cavities 18. The various passageways 16 are then cleared of "runners", after which the assembly may be reclosed and the process repeated.

While specific embodiments have been disclosed herein, it should be understood that various modifications and alterations may be made without departing from the scope and spirit of the invention as defined by the appended claims.

What is claimed is:

1. In the method of injection molding a non-foaming thermoplastic resin into a finished item, which includes the steps of joining at least two cavity-defining parts of a mold together to form a mold cavity having a single opening through which molten thermoplastic material may flow, injecting resin into the cavity through said opening, and thereafter separating the two parts of the mold and removing the finished item therefrom, the improvement which comprises the steps of:

a. providing a movable wall for at least one of the parts of the mold to permit decreasing the size of the cavity and to permit positioning of the wall portion for impingement thereagainst of resin as it is injected into the cavity;

b. constantly urging the movable wall portion in a direction to decrease the size of the cavity to smaller than that of the finished item with a force less than the force of injection molding the resin within the cavity, and c. injecting resin into the cavity under molding pressure in a direction transverse to said wall portion to cause initial impingement against the movable wall portion, whereby as the cavity fills with resin the injection molding force of the resin will cause the movable wall to move in a direction opposite to the urging force and the cavity will be increased to the full size of the item being molded.

* * * * *